US008615141B2

(12) United States Patent
Poon et al.

(10) Patent No.: US 8,615,141 B2
(45) Date of Patent: Dec. 24, 2013

(54) SYSTEMS AND METHODS FOR MOTION BLUR REDUCTION

(75) Inventors: Eunice Poon, Scarborough (CA); Takashi Kurumisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1171 days.

(21) Appl. No.: 12/538,471

(22) Filed: Aug. 10, 2009

(65) Prior Publication Data

US 2011/0033130 A1 Feb. 10, 2011

(51) Int. Cl.
*G06T 5/00* (2006.01)
*H04N 7/50* (2006.01)

(52) U.S. Cl.
USPC ............... 382/264; 382/255; 375/240.13

(58) Field of Classification Search
CPC .......................................... G06T 5/001
USPC .............. 382/255, 264; 375/240.13
See application file for complete search history.

(56) References Cited

U.S. PATENT DOCUMENTS

| | | | |
|---|---|---|---|
| 7,415,163 B2 | 8/2008 | Nishi et al. | |
| 7,437,012 B2 | 10/2008 | Carasso | |
| 8,346,004 B2* | 1/2013 | Oh et al. | 382/255 |
| 2003/0006991 A1 | 1/2003 | De Haan et al. | |
| 2005/0140626 A1 | 6/2005 | Doyen et al. | |
| 2005/0147313 A1* | 7/2005 | Gorinevsky | 382/255 |
| 2005/0231603 A1* | 10/2005 | Poon | 348/208.99 |
| 2006/0280249 A1 | 12/2006 | Poon | |
| 2007/0165961 A1* | 7/2007 | Lu | 382/254 |
| 2008/0137978 A1* | 6/2008 | Fu | 382/255 |
| 2008/0240607 A1 | 10/2008 | Sun et al. | |

FOREIGN PATENT DOCUMENTS

JP 2007188493 7/2007

OTHER PUBLICATIONS

A Deconvolution Method for LCD Motion Blur Reduction, Shay Har-Noy and Truong Q. Nguyen, University of California at San Diego, Department of Electrical and Computer Eigineering, La Jolla, CA 92093, Image Processing, 2006 IEEE, Oct. 8-11, 2006, (pp. 629-632).

Deblurring Texture Extraction from Digital Aerial Image by Reforming "Steep Edge" Curve, Wu Jun and Chen Danqing, Wuhan University of Technology, vol. 8, No. 1, Mar. 2005, (pp. 39-44).

Motion Blur Reduction for Liquid Crystal Displays: Motion Compensated Inverse Filtering, Michiel A. Klompenhouwer and Leo Jan Velthoven, Philips Research Laboratories, prof., Eindhoven, Netherlands, International Society for Optical Engineering, Jan. 1999, (pp. 690-699).

Contrast Restoration by Adaptive Countershading, Grzegorz Krawczyk, Karol Myszkowski and Hans-Peter Seidel, Max-Planck-Institut fur Informatik, Saarbrucken, Germany, Eurographics 2007, vol. 26, (2007), No. 3, Jan. 2007, (pp. 1-10).

(Continued)

*Primary Examiner* — Matthew Bella
*Assistant Examiner* — Jose M Torres

(57) ABSTRACT

Method and apparatuses for compensating for perceived blur due to inter-frame motion in a sequence of digital video frames are disclosed. One example method includes blurring a current frame using first and second blurring filters to generate first and second blurred frames, respectively. A first weighted combination of the current frame, the first blurred frame, and the second blurred frame is then blurred with the first blurring filter to generate a third blurred frame. The current frame is combined with the third blurred frame in a second weighted combination to generate a blur-compensated frame.

19 Claims, 12 Drawing Sheets

(56) References Cited

OTHER PUBLICATIONS

LCD Motion Blur Reduction: A Signal Processing Approach, Shay Har-Noy, Studen Member, IEEE, and Truong Q. Nguyen, Fellow, IEEE, Image Processing, IEEE Transactions on Feb. 2008, vol. 17, Issue 2, (pp. 117-125).

Restoration of Motion Blurred Images, Juwei Lu, Eunice Poon, Epson Edge, Epson Canada Limited and K.N. Plataniotis, The Edward S. Rogers Sr. Department of Electrical and Computer Engineering, University of Toronto, Canada, IEEE International Conference, Jul. 9-12, 2006, (pp. 1193-1196).

Spatio-Temporal Frequency Analysis of Motion Blur Reduction on LCDS, F. H. van Heesch and M.A. Klompenhouwer, Philips Research Laboratories, High Tech Campus 36, Eindhoven, Netherlands, Sep. 16, 2007-Oct. 19, 2007, (pp. IV-401-IV 404).

\* cited by examiner

SYSTEMS AND METHODS FOR MOTION BLUR REDUCTION

THE FIELD OF THE INVENTION

Embodiments of the invention relate to reducing blur perceived by the human eye in digital video frames depicting inter-frame motion on a digital video hold-type display. More specifically, disclosed embodiments relate to methods, devices, and computer-readable media for reducing perceived blur due to inter-frame motion.

BACKGROUND

Moving objects in digital video displayed on a hold-type display device, such as a liquid crystal display (LCD), can appear blurry to an observer. The perceived blur is caused in part by the relatively slow "LC response" of the liquid crystal cells. When compared with an impulse-type device such as a cathode ray tube (CRT) device, for example, an LCD device has a much slower brightness transition response time. The perceived blur is also caused in part by prolonged light emission inherent in the sample-and-hold driving technique commonly employed by LCD devices, which results in formation of after-images on the human retina. These after-images produce a blurred visual perception as a moving object is being observed in the video sequence.

For example, as an input video sequence is input to an LCD device, each digital video image (alternatively referred to as a frame), from the input video sequence is displayed and sustained on the LCD device for one frame interval. While viewing an object in motion in a scene, the human eyes actively track the object with smooth pursuit eye movement so as to generate a stabilized image on the human retina. The combination of the LCD device and the tracking behavior of the human visual system, however, results in a spatial low pass filtering effect, i.e., a blur effect.

Numerous methods have been proposed to compensate for motion blur. One method is to insert a black frame between each pair of frames in a frame sequence. This method essentially simulates an impulse display, which does not suffer perceived motion blur problems. However, an overall reduction in brightness results from implementation of this method. Alternatively, video pre-processing may be applied to frames of the digital video sequence prior to display on the hold-type device. Video pre-processing methods that presently exist have certain drawbacks, however, such as high computational cost, loss of resolution, or artifacts such as false motion edges and frame juddering.

SUMMARY OF EXAMPLE EMBODIMENTS

In general, example embodiments relate to methods, devices, and computer-readable media for compensating for perceived blur due to inter-frame motion in a sequence of digital video frames.

In a first example embodiment, a method for compensating for perceived blur due to inter-frame motion includes generating a guess frame based on a current frame. A regularization term is then calculated for each of a plurality of pixels in the guess frame. Each of the plurality of pixels in the guess frame is blurred as a function of a direction and extent of inter-frame motion. Each blurred pixel is compared with a respective pixel in the current frame to generate an error pixel for each respective pixel and each error pixel is then blurred. Each blurred error pixel is adjusted based on its respective regularization term and each adjusted error pixel is combined with its respective pixel in the guess frame to update the guess frame and compensate for blur.

An example apparatus that compensates for perceived blur due to inter-frame motion according to the method of the first example embodiment includes a regularization term generator, a motion simulator, and an image updater. The regularization term generator is configured to calculate a regularization term for each of a plurality of pixels in a guess frame derived from a current frame. The motion simulator is configured to blur the plurality of pixels in the guess frame as a function of a direction and extent of inter-frame motion, compare each blurred pixel with a respective pixel in the current frame to generate an error pixel for each respective pixel, and blur each error pixel. The image updater is configured to adjust each blurred error pixel based on its respective regularization term, and combine each adjusted error pixel and its respective pixel in the guess frame to update the guess frame and compensate for blur.

In a second example embodiment, a method for compensating for perceived blur due to inter-frame motion includes generating a guess frame based on a current frame and combining a plurality of blurring filters derived from a direction and extent of inter-frame motion to form a blur-compensating filter. Each of a plurality of pixels in the guess frame is processed using the blur-compensating filter. Each processed pixel is compared with a respective pixel in the current frame to generate an intensity adjustment for each respective pixel. Each pixel in the guess frame is then adjusted with its respective intensity adjustment to generate a blur-compensated frame.

An example apparatus that compensates for perceived blur due to inter-frame motion according to the method of the second example embodiment includes a blur-compensating filter generator, a motion simulator, and an image updater. The blur-compensating filter generator is configured to combine a plurality of blurring filters derived from a direction and extent of inter-frame motion to form a blur-compensating filter. The motion simulator is configured to process a plurality of pixels in the guess frame using the blur-compensating filter, and compare each processed pixel with a respective pixel in the current frame to generate an intensity adjustment for each respective pixel. The image updater is configured to adjust each pixel in the guess frame with its respective intensity adjustment to generate a blur-compensated frame.

In a third example embodiment, a method for compensating for perceived blur due to inter-frame motion includes blurring a current frame using first and second blurring filters to generate first and second blurred frames, respectively. A weighted combination of the current frame, the first blurred frame, and the second blurred frame is then blurred with the first blurring filter to generate a blur-compensated frame.

An example apparatus that compensates for perceived blur due to inter-frame motion according to the method of the third example embodiment includes a motion sharpening filter. The motion sharpening filter includes first and second blurring filters configured to blur a current frame to generate first and second blurred frame, respectively; a frame combiner configured to combine the current frame, the first blurred frame, and the second blurred frame; and a third blurring filter configured to blur the combination of frames to generate a blur-compensated frame.

In a fourth example embodiment, a method for compensating for perceived blur due to inter-frame motion includes blurring a current frame using first and second blurring filters to generate first and second blurred frames, respectively. A first weighted combination of the current frame, the first blurred frame, and the second blurred frame is then blurred with the first blurring filter to generate a third blurred frame. The current frame is combined with the third blurred frame in a second weighted combination to generate a blur-compensated frame.

An example apparatus that compensates for perceived blur due to inter-frame motion according to the method of the fourth example embodiment includes a motion sharpening filter. The motion sharpening filter includes first and second blurring filters configured to blur a current frame to generate first and second blurred frame, respectively; a first frame combiner configured to combine the current frame, the first blurred frame, and the second blurred frame to generate a combination of frames; a third blurring filter configured to blur the combination of frames; and a second frame combiner configured to combine the current frame with the blurred combination of frames to generate a blur-compensated frame.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION

Figure 1:
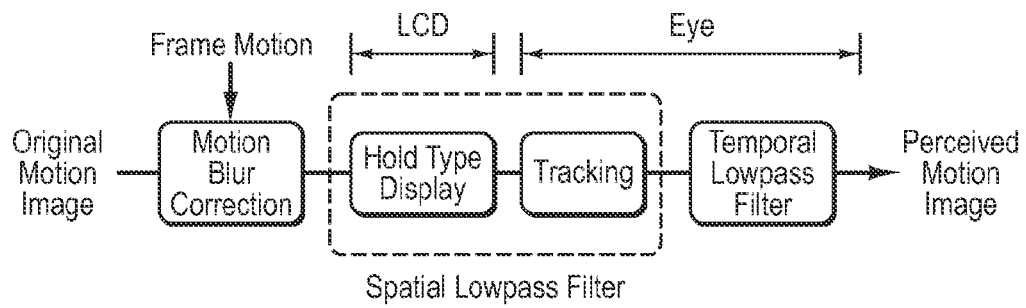
FIG. 1 is a schematic diagram view of a system that performs motion blur pre-compensation for a spatial low pass filtering effect, given an estimate of motion between frames.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for compensating for inter-frame motion in a sequence of digital video frames such that a blur that is otherwise perceived due to the inter-frame motion is eliminated or reduced prior to displaying the frames. Such pre-compensation techniques may variously be referred to herein as inter-frame motion reduction or compensation, motion blur reduction or compensation, or the like. Example embodiments can be used in conjunction with a variety of image processing applications to produce digital video frames in which perceived blur is minimized. For example, prior to compensating for inter-frame motion a motion vector characterizing inter-frame motion may be estimated.

Example methods for detecting inter-frame motion and generating a motion vector are described in co-pending U.S. patent application Ser. No. 12/538,940 filed on Aug. 11, 2009, entitled "System And Method For Global Inter-Frame Motion Detection In Video Sequences," the disclosure of which is incorporated herein by reference in its entirety.

Example methods for estimating inter-frame motion vectors associated with local regions of motion in frames are described in co-pending U.S. patent application Ser. No. 11/377,030 filed on Mar. 16, 2006, entitled "Method And System For Estimating Motion And Compensating For Perceived Motion Blur In Digital Video," the content of which is also incorporated herein by reference.

To compensate for the perceived blur problem discussed above (examples of which are described in more detail in co-pending U.S. patent application Ser. No. 11/377,030), motion blur pre-compensation techniques have been developed and will now be described with reference to FIGS. 1 through 3. Turning now to FIG. 1, a schematic diagram of a system that performs motion blur pre-compensation for a spatial low pass filtering effect, given an estimate of motion between frames, is shown.

Figure 2:
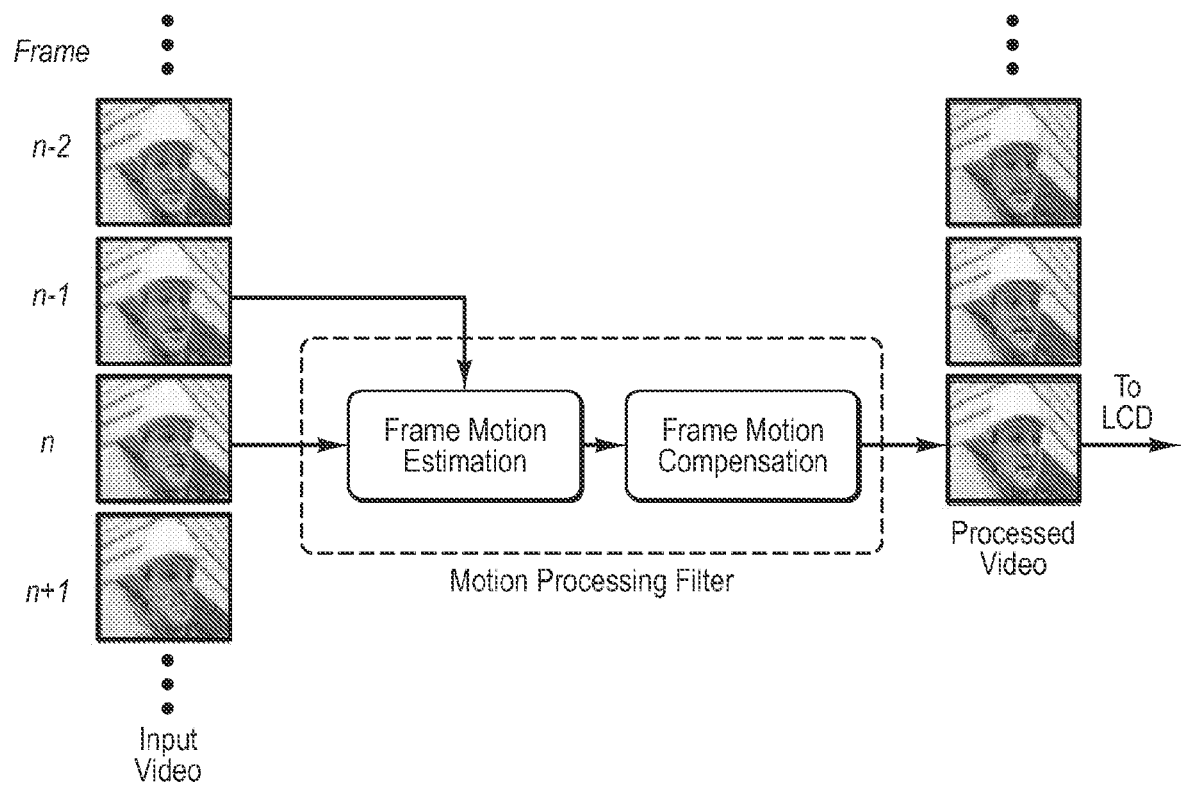
FIG. 2 is another schematic diagram view of a system that performs motion blur pre-compensation for the spatial low pass filtering effect.

FIG. 2 is another schematic diagram showing motion blur pre-compensation for the spatial low pass filtering effect. In FIG. 2, each frame of a digital video sequence passes through a motion processing filter, which performs frame motion estimation and frame motion compensation. The output of the motion processing filter is provided to the LCD device. A two-frame memory buffer (not shown) is provided for enabling the digital video sequence to be processed in real-time.

Figure 3:
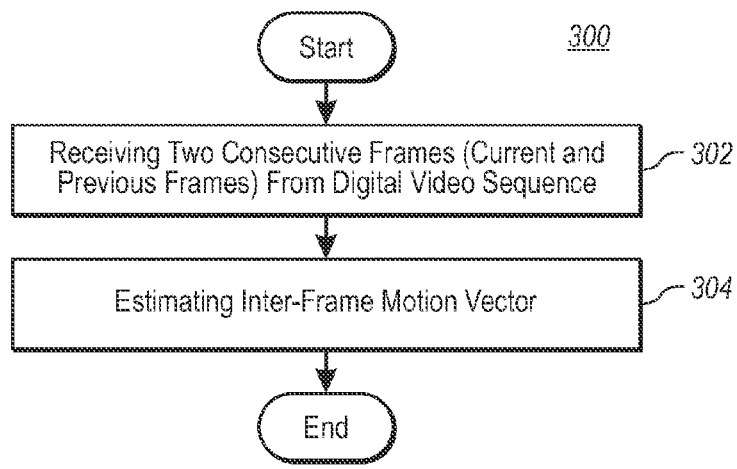
FIG. 3 is a flowchart showing stages occurring prior to motion blur pre-compensation.

FIG. 3 is a flowchart 300 showing stages performed prior to compensating for perceived blur in a digital video sequence based on motion of pixels between frames. Upon receipt of two consecutive or successive digital video frames (a current frame Fn and a previous frame Fn−1) (stage 302), a motion vector characterizing inter-frame between the frames is estimated for the current frame (step 304). (If inter-frame motion is not global, a motion vector may be estimated for each of a plurality of pixel blocks or clusters of pixels, as described in co-pending U.S. patent application Ser. No. 11/377,030, and the methods described herein may be applied in succession, in parallel, or some combination thereof, to each of the plurality of blocks or clusters to compensate for blur.)

Four alternative embodiments for performing video pre-processing to compensate for perceived motion blur using the estimated motion vector(s) will now be described with reference to FIGS. 4 through 17. The video pre-processing operations described in the following sections may be applied separately in succession, in parallel, or some combination of both, to each input color channel of a current frame. For simplicity of explanation, the operations for a single color channel are described, with the understanding that the same operations can be repeated on other channels. If the input format is YCbCr, performance of the pre-processing operations may be optimized by processing the luminance (Y) channel data only. Thus, when an operation is described herein as being performed on a pixel it is to be understood that the operation is performed on a color or luminance channel of the pixel.

First Example Embodiment

Figure 4:
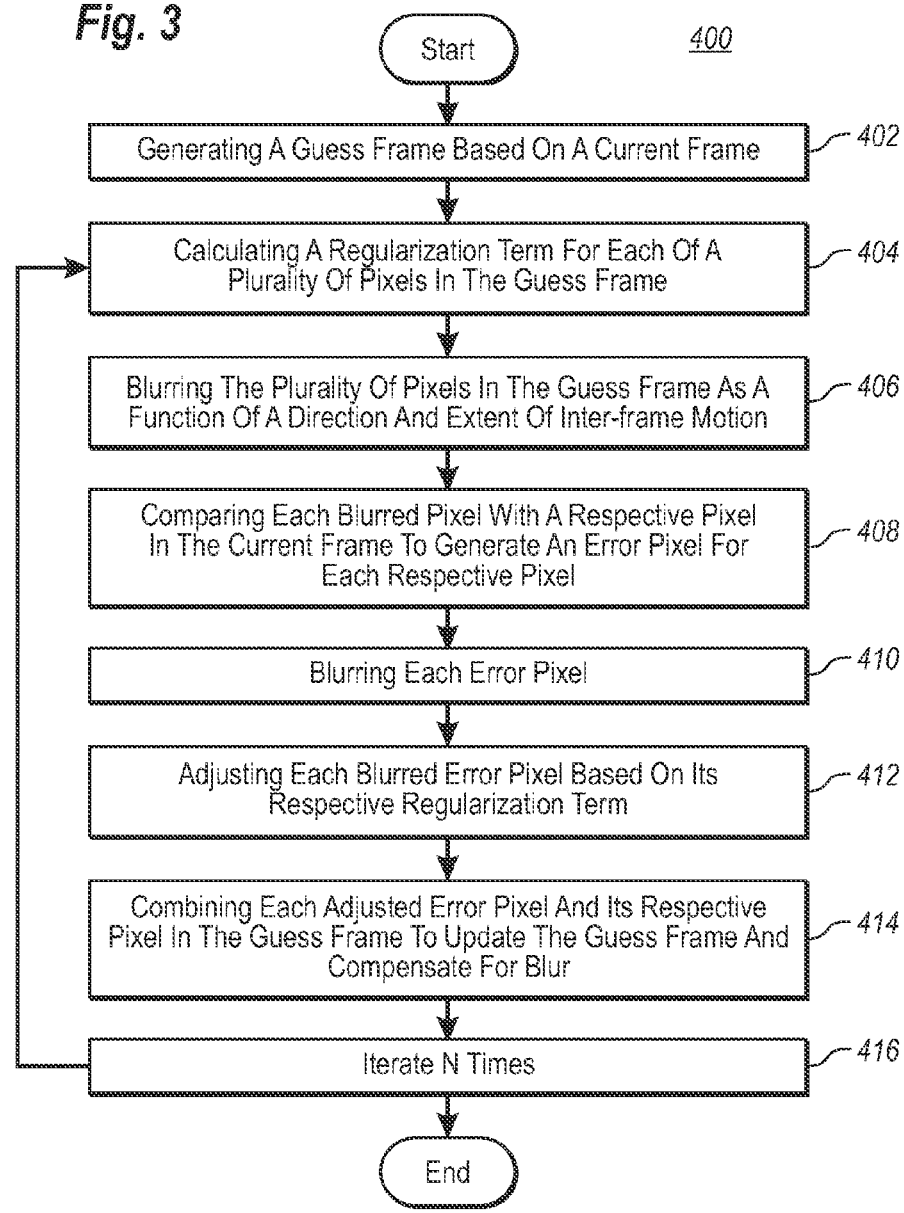
FIG. 4 is a flowchart for a first example method for motion blur pre-compensation.

FIG. 4 is a flowchart showing stages for a first example method 400 for compensating for inter-frame motion. The example method 400 iteratively processes pixels in a current frame based on a direction and extent of inter-frame motion to transform the current frame into a blur-compensated frame to be displayed in place of the current frame. The direction and extent of inter-frame motion may be characterized by a motion vector having an x-direction component and a y-direction component. By iteratively processing the intensity data in a color or luminance channel corresponding to pixels in a current frame, the frame is progressively adjusted while reducing the likelihood of overcompensation. Moreover, to address the presence of noise in the frame, a regularization term is calculated to avoid noise amplification and reduce ringing artifacts. The symbols and parameters in Tables 1 and 2 below are used in describing method 400.

TABLE 1

| Symbol | Description |
|---|---|
| H | Uniform one-dimensional blurring filter defined by dx (input frame motion in X direction in pixels per frame) and dy (input frame motion in Y direction in pixels per frame) |
| S | $3 \times 3$ Sobel filter, $S = \frac{1}{4}\begin{bmatrix} -1 & -2 & -1 \\ 0 & 0 & 0 \\ 1 & 2 & 1 \end{bmatrix}$ |
| W | Preprocessing regularization term |
| ΔI | Preprocessing intensity adjustment term |
| $O_n$ | Output image at iteration n |

TABLE 2

| Parameter | Description | Typical Range | Default Value |
|---|---|---|---|
| N | Maximum number of iterations | [5, 40] | 10 |
| β | Adjustment step size | [1.0, 6.5] | 5.0 |
| η | Regularization parameter (a larger value produces smoother results relative to a smaller value) | [0.01, 0.5] | 0.05 |
| k | Step size reduction factor per iteration | [0.75, 1.0] | 0.85 |
| $ΔI_{max}$ | Maximum intensity adjustment per iteration | [1, 10] | 2 |

First, an act of generating a guess frame based on a current frame is performed (stage 402). For example, the current frame I may be set as the guess frame $O_o$. Then, a regularization term W may be calculated for each of a plurality of pixels in the guess frame $O_o$ (stage 404).

Calculating a regularization term for a pixel includes calculating a first order derivative or gradient in horizontal and vertical directions, normalizing the horizontal and vertical gradients, and combining a horizontal gradient of the normalized horizontal gradient of the pixel with a vertical gradient of the normalized vertical gradient of the pixel. The horizontal and vertical gradients, $G_h$ and $G_v$, of a pixel may be calculated as follows:

$$G_h = O_{n-1} \otimes S^{*T}, \quad (1)$$

$$G_v = O_{n-1} \otimes S^*, \quad (2)$$

where $S^T$ denotes the transpose of the 3×3 Sobel filter S (defined in Table 1 above), $S^*(x,y)$ denotes $S(-x,-y)$, and the operator $\otimes$ denotes a two-dimensional image convolution operation.

Next, the horizontal and vertical gradients, $G_h$ and $G_v$, are normalized as follows:

$$G'_h = \frac{G_h}{|G_h| + |G_v|}, \quad (3)$$

$$G'_v = \frac{G_v}{|G_h| + |G_v|}. \quad (4)$$

Using the normalized horizontal and vertical gradients, $G'_h$ and $G'_v$, the regularization term W is calculated as follows:

$$W = (G'_h \otimes S^T) + (G'_v \otimes S). \quad (5)$$

Next, the acts of blurring the plurality of pixels in the guess frame as a function of the direction and extent of inter-frame motion, comparing each blurred pixel with a respective pixel in the current frame to generate an error pixel for each respective pixel, blurring each error pixel, and adjusting each blurred error pixel based on its respective regularization term are performed (stages 406-412). For example, the following intensity adjustment term formula may be used to blur the plurality of pixels, compare each blurred pixel with a respective current frame pixel to generate an error pixel, and adjust each blurred error pixel based on its respective regularization term:

$$\Delta I = \beta \cdot (H^* \otimes \otimes (I - O_{n-1} \otimes H) - \eta \cdot W), \quad (6)$$

where $H^* = H$ for real, symmetrical filters.

At 414, an act of combining each adjusted error pixel and its respective pixel in the guess frame is performed to update the guess frame and compensate for blur. The combining may include clipping the intensity adjustment term so that the adjustment term does not exceed a predetermined maximum adjustment value, e.g., as follows:

$$\Delta I = \min(\max(\Delta I, -\Delta I_{max}), \Delta I_{max}) \quad (7)$$

A pixel updating formula may also provide a clipping function so that none of the pixel intensity values is outside an allowable range, such as 0 to 255, e.g., as follows:

$$O_n(x,y) = \min(\max(O_{n-1}(x,y) + \Delta I, 0), 255). \quad (8)$$

The index n is then incremented and stages 404 to 414 are iterated for each pixel in $O_n$ (stage 416). The iterations are repeated a predetermined maximum number of iterations, N. With each iteration the adjustment step size, $\beta$, may be reduced by a reduction factor, k, after each iteration by the following formula:

$$\beta = k \cdot \beta \quad (9)$$

After iterating stages 404 to 414 the predetermined number N times, a result image $O = O_n$ may be returned.

Figure 5:
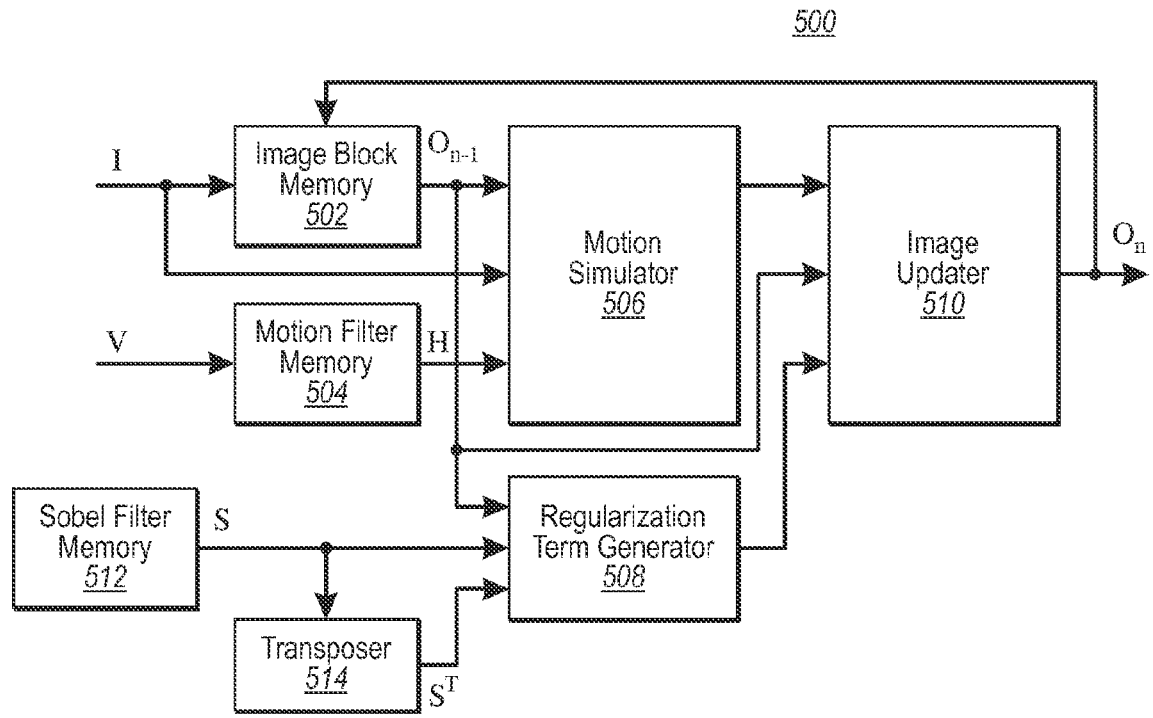
FIG. 5 is a functional block diagram view of a first example apparatus for performing the first example method.

FIG. 5 is a functional block diagram of an example apparatus 500 for performing method 400 of FIG. 4. Apparatus 500 includes an image block memory 502, a motion filter memory 504, a motion simulator 506, a regularization term generator 508, an image updater 510, a Sobel filter memory 512, and a transposer 514. Apparatus 500 may also include one or more processors (not shown) for controlling processes carried out by modules 502-514.

Image block memory 502 receives and stores image data. During a first iteration of the stages in method 400 (n=1), a current image I, or portion thereof, is received and stored in block memory 502. Thus, the initial output from image block memory 502 (i.e., $O_0$) is I, but then becomes an updated image from image updater 510 (i.e., $O_n$–1 for all n>1) with each subsequent iteration of the stages in method 400. The output $O_n$–1 of image block memory 502 is fed to motion simulator 506, regularization term 508, and image updater 510. The current image I is also fed to motion simulator 506.

Motion filter memory 504 receives and stores a motion vector V and may reformat the motion vector V to output a blur filter H, which is fed to motion simulator 506. Motion simulator 506 generates a motion simulation output, which is fed to image updater 510. Using a Sobel filter S, from Sobel filter memory 512, and its transpose $S^T$, from transposer 514, regularization term generator 508 produces a regularization term for updated image $O_{n-1}$, which is also fed to image updater 510. Based on the motion simulation output, the regularization term, and updated image $O_{n-1}$, image updater 510 generates pixels for an output image $O_n$, which is returned as the blur-compensated image O after N iterations of image updating. Motion simulator 506, regularization term generator 508, and image updater 510 are discussed below in greater detail with reference to FIGS. 6A, 6B, and 6C, respectively.

Figure 6A:
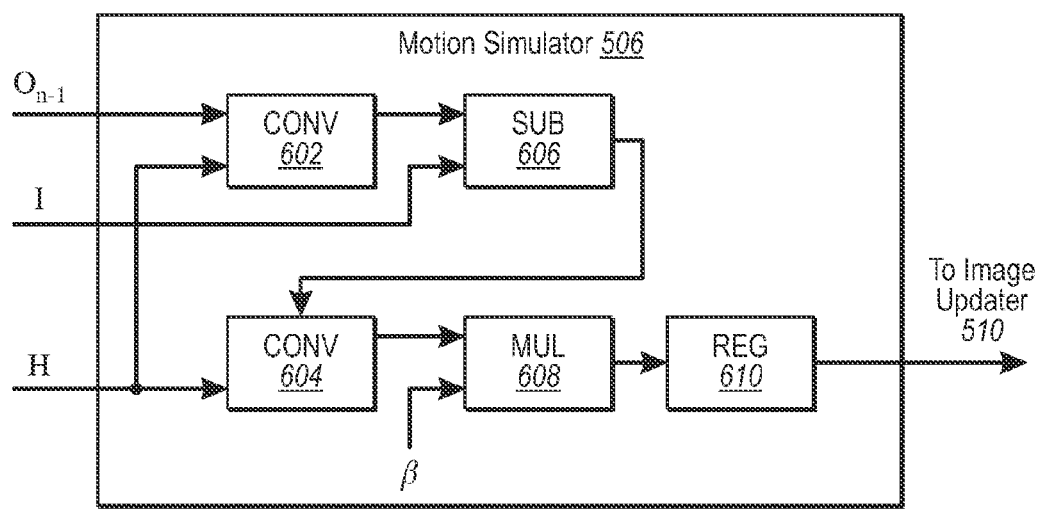
FIG. 6A is a functional block diagram view of a motion simulator in the first example apparatus of FIG. 5.

FIG. 6A shows a functional block diagram view of motion simulator 506 from apparatus 500 in FIG. 5. Motion simulator 506 includes image convolution modules 602 and 604, a subtraction module 606, and multiplier module 608, and a register 610. In accordance with Equation (6) above, image convolution module 602 operates to blur the plurality of pixels in the image $O_{n-1}$ by convolving the pixels in image $O_{n-1}$ with the blur filter H, which is derived from the inter-frame motion vector V. Subtraction module 606 operates to compare each blurred pixel with a respective pixel in the current frame I to generate an error pixel for each respective pixel. Image convolution module 604 operates to blur each error pixel by convolving the error pixels output from subtraction module 606 with the blur filter H. The output of convolution module 604 is multiplied by the iteratively reduced adjustment step size at multiplier module 608 and the result is stored in register 610, which is fed to image updater 510.

Figure 6B:
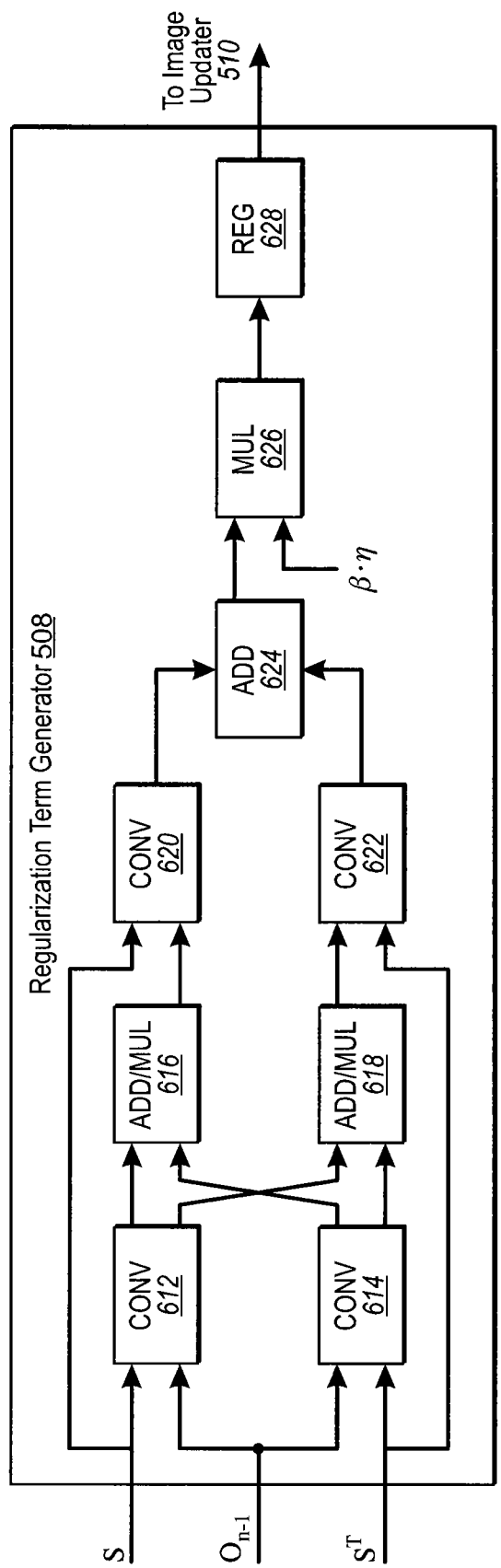
FIG. 6B is a functional block diagram view of a regularization term generator in the first example apparatus of FIG. 5.

FIG. 6B shows a functional block diagram view of regularization term generator 508 from apparatus 500 in FIG. 5. Regularization term generator 508 includes a first set of image convolution modules 612 and 614, addition/multiplication modules 616 and 618, a second set of image convolution modules 620 and 622, an addition module 624, and multiplication module 626, and a register 628. In accordance with Equations (1) and (2) above, first set of image convolution modules 612 and 614 operate to calculate a first order derivative of pixels in image $O_{n-1}$ in the horizontal and vertical directions using the Sobel filter S. Then, in accordance with Equations (3) and (4), add/multiply modules 616 and 618 operate to normalize the horizontal and vertical gradients computed by first set of image convolution modules 612 and 614. In accordance with Equation (5), second set of image convolution modules 620 and 622 then calculate addends of the regularization term W using the Sobel filter S and the addends are then summed by addition module 624. The regularization term W is scaled at multiplication module 626 by the regularization parameter $\eta$ and the adjustment step size $\beta$ and the result is stored in register 628, which is fed to image updater 510.

When performing a convolution operation with any one of convolution modules 602, 604, 612, 614, 620, or 622, each pixel is affected by pixel intensity values in a neighborhood local to the pixel. However, for a pixel that lies at or near an image border the local neighborhood includes pixels outside the image area for which no intensity values exist. To process pixels at or near the border of an image any out-of-frame pixels required for the convolution operation may be reflected, ignored, or set to zero.

Figure 6C:
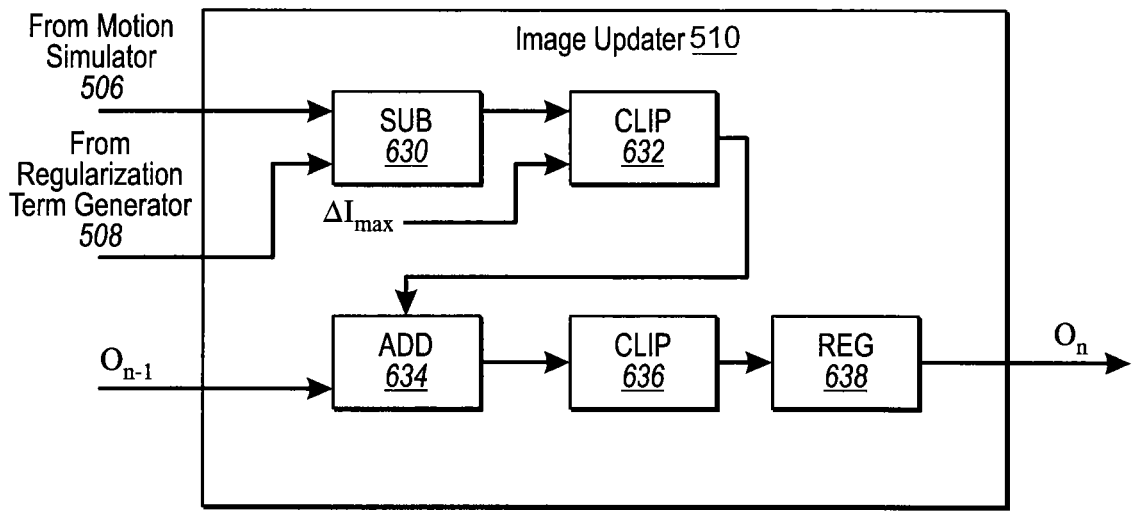
FIG. 6C is a functional block diagram view of an image updater in the first example apparatus of FIG. 5.

FIG. 6C shows a functional block diagram view of image updater 510 from apparatus 500 in FIG. 5. Image updater 510 includes a subtraction module 630, a first clipping module 632, an addition module 634, a second clipping module 636, and a register 638. In accordance with Equation (6) above, the output of motion simulator 506 is regularized with the scaled regularization term $\beta\eta W$ using subtraction block 630. The result is an intensity adjustment value $\Delta I$ that is clipped to a maximum value $\Delta I_{max}$ using first clipping module 632. Pixels in the image $O_{n-1}$ are then adjusted with the clipped adjustment value at addition module 634 and pixels in the resulting image $O_n$ are clipped to be within a permissible intensity range by second clipping module 636. The result is stored in register 638 and output as image $O_n$. If the current iteration index n has not reached the maximum number of iterations N, pixels in image $O_n$ are fed back to image block memory 502 (see FIG. 5) as pertaining to a new intermediate or updated image $O_{n-1}$. Otherwise, the image $O_n$ is returned as the blur-compensated image O.

The size of image block memory 502 stores pixels from the initial image I and from intermediate images $O_{n-1}$. Image block memory 502 may have enough capacity to store all pixels in an image or only a portion thereof. At a minimum, the size of image block memory 502 may be configured to process one scanline of an image at a time, in which case the minimum block memory size may be calculated as follows:

$$\text{Minimum Block Memory Size} = \left(\left\lfloor\frac{\text{Maximum Motion Vector Size}}{2}\right\rfloor \times 4 + 1\right) \times \text{Line Memory Size}, \quad (10)$$

where Line Memory Size denotes the size of one scanline on a target display panel and Maximum Motion Vector Size denotes a maximum expected magnitude of a motion vector, measured in pixels per frame. For example, if one scanline of the target display panel is composed of 320 pixels, each represented by 24 bits, and the maximum motion vector size is 16, then the minimum block memory size would be (8×4+1)×320×24 bits=253,440 bits. Using a block memory with the minimum size conserves memory resources at the cost of a longer frame processing time because calculations must be repeated at each pixel location for pixels outside the block memory area. Thus, to reduce processing time, the block memory size may be increased to store all pixels in an input or intermediate image.

Second Example Embodiment

Figure 7:
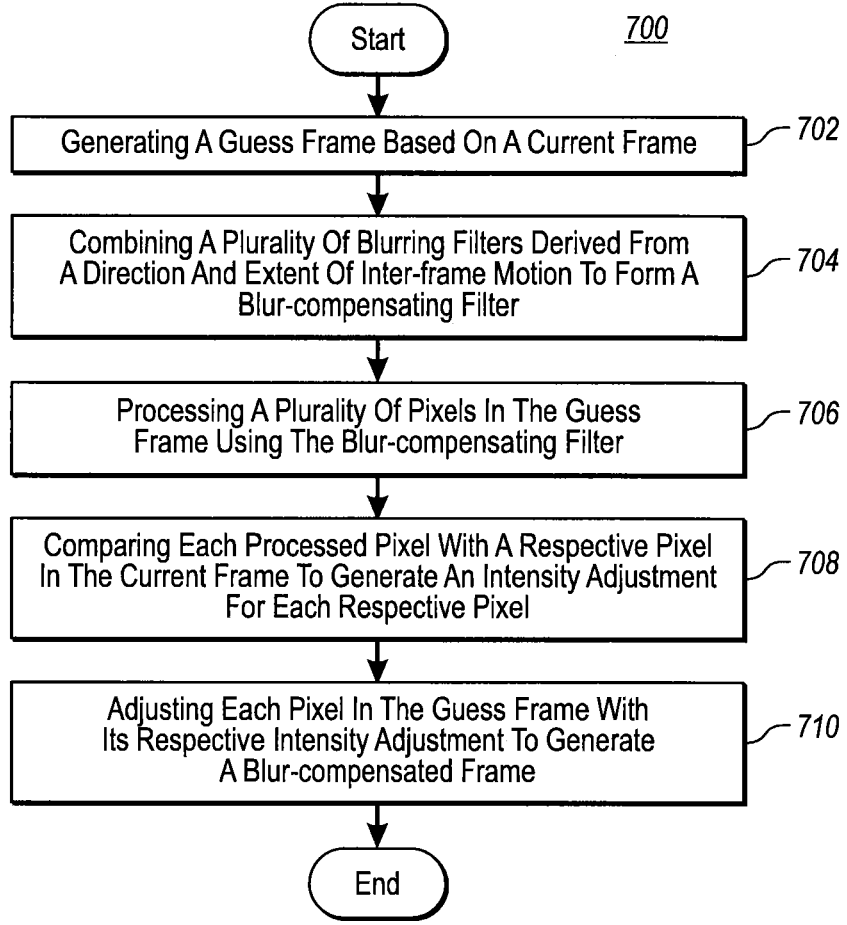
FIG. 7 is a flowchart for a second example method for motion blur pre-compensation.

FIG. 7 is a flowchart showing stages for a second example method 700 for compensating for inter-frame motion. As in the first example method 400, method 700 processes pixels in a current frame based on a direction and extent of inter-frame motion to transform the current frame into a blur-compensated frame to be displayed in place of the current frame. However, the iterative method of the first embodiment can be too resource intensive under some circumstances, particularly when implemented on an embedded device platform where processing power and memory resources are limited. Thus, the second embodiment provides an alternative that uses less processing resources and memory than the first embodiment by reducing the number of processing iterations.

First, a guess frame is generated based on a current frame (stage 702). A plurality of blurring filters are then derived from the direction and extent of inter-frame motion and combined to form a blur-compensating filter (stage 704). For example, the blur-compensating filter may be a linear combination of filters constructed from the blurring filter H described above in connection with the first embodiment, which is defined by an inter-frame motion vector characterizing a direction and extent of inter-frame motion. The blur-compensating filter may be a filter that, when convolved with the guess frame, approximates the effect of performing the iterative process described above in connection with the first embodiment. The blur-compensating filter may be derived by removing non-linear operations (i.e., the regularization term in Equation (6) and the clipping operations in Equations (8) and (9) above) from the iterative process, resulting in the following formula for $O_n$:

$$O_n = O_{n-1} + \beta \cdot (H^* \otimes (I - O_{n-1} \otimes H)) \quad (11)$$

Omitting the adjustment step size $\beta$ for clarity, the output image $O_N$ resulting from N iterations of Equation (11) may be expressed in terms of I and H. By way of explanation, a notation $H_m$ is introduced, which is defined recursively from H as follows:

$$H_1 = H^* \quad (12)$$

$$H_2 = H^* \otimes H$$

$$H_3 = H^* \otimes H \otimes H^*$$

$$\vdots$$

$$H_m = \begin{cases} H_{m-1} \otimes H & \text{if } m \text{ is odd} \\ H_{m-1} \otimes H^* & \text{if } m \text{ is even} \end{cases}$$

A notation $G_n$ is also introduced for purposes of explanation, where $G_n$ is a filter that transforms I directly into $O_n$:

$$O_n = G_n \otimes I \quad (13)$$

Applying the notation of Equation (12) and omitting $\beta$ for clarity, Equation (11) may be rewritten as follows:

$$O_n = O_{n-1} + H_1 \otimes I - H_2 \otimes O_{n-1} \quad (14)$$

Continuing with application of the notation of Equation (13), each iteration of the iterative blur-compensating process may be expressed as follows:

$$n=0: \quad O_0 = I \quad (15)$$

$$n=1: \quad O_1 = O_0 + H_1 \otimes I - H_2 \otimes O_0$$
$$= I + H_1 \otimes I - H_2 \otimes I$$
$$= (1 + H_1 - H_2) \otimes I$$
$$= G_1 \otimes I$$

$$\vdots$$

$$n=2: \quad O_2 = O_1 + H_1 \otimes I - H_2 \otimes O_1$$
$$= (I + H_1 \otimes I - H_2 \otimes I) +$$
$$\quad H_1 \otimes I - H_2 \otimes (I + H_1 \otimes I - H_2 \otimes I)$$
$$= (1 + 2H_1 - 2H_2 - H_3 + H_4) \otimes I$$
$$= G_2 \otimes I$$

$$\vdots$$

$$n=3: \quad O_3 = O_2 + H_1 \otimes I - H_2 \otimes O_2$$
$$= O_2 + H_1 \otimes I - H_2 \otimes$$
$$\quad (I + 2H_1 \otimes I - 2H_2 \otimes I - H_3 \otimes I + H_4 \otimes I)$$
$$= (1 + 3H_1 - 3H_2 - 3H_3 + 3H_4 + H_5 - H_6) \otimes I$$
$$= G_3 \otimes I$$

$$n=N: \quad O_N = O_{N-1} + H_1 \otimes I - H_2 \otimes O_{N-1}$$
$$= \left(\begin{array}{c} 1 + n \cdot H_1 - n \cdot H_2 + \\ \sum_{i=3}^{2n}(\alpha_{n-1,i} - \alpha_{n-1,i-2}) \cdot H_i \end{array}\right) \otimes I$$
$$= G_N \otimes I$$

where $\alpha_{n,i}$ denotes the coefficient associated with $H_i$ at iteration n, and $\alpha_{n,m}=0$ for i>2n. Thus, the output image $O_N$ can be obtained without iterative updates to an intermediate image $O_n$. Instead, the original image I is convolved with an approximate blur-compensating filter $G_n$ that is a linear combination of filters constructed from blurring filter H. As $G_n$ depends only on the blurring filter H and not on the input image I, its values can be pre-computed and stored in memory before run time.

The approximate blur-compensating filter $G_n$ will be large in comparison to blurring filter H. For example, if n=20 (corresponding to 20 iterations), the resulting filter $G_n$ will have a filter radius that extends beyond 100 pixels. However, the outer coefficients of $G_n$ rapidly approach zero. Therefore, processing time may be reduced without significant impact on performance by truncating parts of $G_n$ to produce a truncated filter $\overline{G}_n$. Thus, for a 1-D filter, truncating may be performed as follows:

$$\overline{G}_n(r) = \begin{cases} G_n(r) & \text{if } |r| \le R \\ 0 & \text{otherwise} \end{cases} \quad (16)$$

After truncation, the coefficients of $\overline{G}_n$ are re-weighted to ensure they sum to one. The value of R may be chosen to ensure a majority of coefficients in $G_n$ are retained. For example, assigning R to be $4 \times R_H$, where $R_H$ is the radius of blurring filter H, produces acceptable results. Therefore, given a blurring function H, the coefficients of the truncated approximate blur-compensating filter $\overline{G}_n$ may be computed and stored in a look-up table.

A plurality of pixels in the guess frame are then processed using the truncated approximate blur-compensating filter $\overline{G}_n$ (stage 706) and each processed pixel is compared with a respective pixel in the current frame to generate an intensity adjustment for each respective pixel (stage 708). The processing and comparison may be performed in accordance with the following formula:

$$\Delta I = I - \overline{G}_n \otimes I \quad (17)$$

Then, each pixel in the guess frame is adjusted with its respective intensity adjustment to generate a blur-compensated frame (stage 710). However, the intensity adjustment may first be clipped with $\Delta I_{max}$, as follows:

$$\Delta I = \min(\max(\Delta I, -\Delta I_{max}), \Delta I_{max}), \quad (18)$$

and pixel intensities may also be clipped as follows:

$$O_n(x,y) = \min(\max(I + \Delta I, 0), 255). \quad (19)$$

The resulting image $O_n$ may be returned as the blur-compensated frame O.

Figure 8:
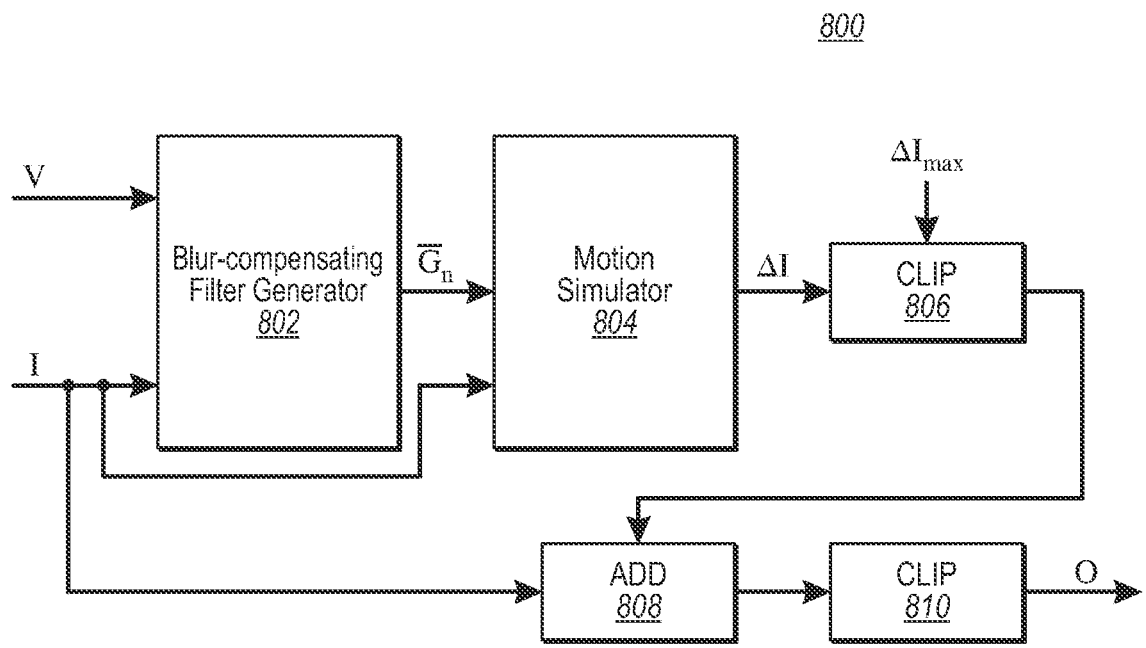
FIG. 8 is a functional block diagram view of a second example apparatus for performing the second example method.

FIG. 8 is a functional block diagram of an example apparatus 800 for performing method 700 of FIG. 7. Apparatus 800 includes a blur-compensating filter generator 802, a motion simulator 804, a first clipping module 806, an addition module 808, and a second clipping module 810. Apparatus 800 may also include one or more processors (not shown) for controlling processes carried out by modules 802-810.

Blur-compensating filter generator 802 is configured to receive a plurality of pixels pertaining to input image I and motion vector V and derive the truncated approximate blur-compensating filter $\overline{G}_n$ therefrom in accordance with Equations (15) and (16) above. As discussed above, motion vector V may be processed or reformatted to produce blur filter H. Filter $\overline{G}_n$ is received by motion simulator 804, which is configured to calculate an intensity adjustment value $\Delta I$ in accordance with Equation (17) above based on filter $\overline{G}_n$.

Figure 9:
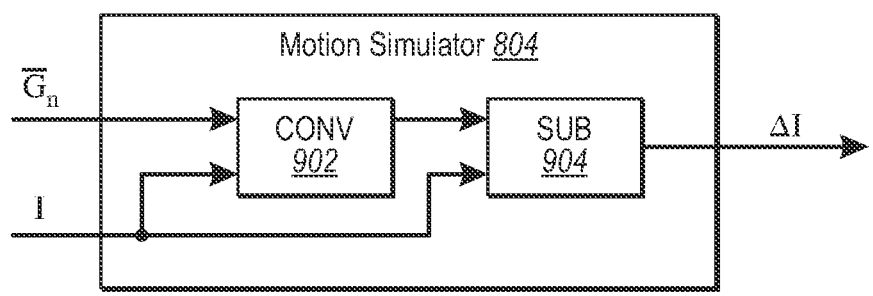
FIG. 9 is a functional block diagram view of a motion simulator in the second example apparatus of FIG. 8.

FIG. 9 shows a detailed view of motion simulator 804. Motion simulator 804 includes a convolution module 902 and a subtraction module 904. In accordance with Equation (17) above, convolution module 902 convolves or filters pixels pertaining to input image I with filter $\overline{G}_n$. Subtraction module 904 then calculates a difference between the convolution result and the pixels of input image I, producing an intensity adjustment value $\Delta I$ for each pixel.

Referring again to FIG. 8, clipping module 806 clips intensity adjustment value $\Delta I$ using $\Delta I_{max}$ and the pixels of input image I are adjusted with their respective clipped adjustment values by addition module 808. The resulting pixels are clipped to be within a permissible intensity range by second clipping module 810, thereby producing output image O.

The number of iterations N approximated by blur-compensating filter $\overline{G}_n$ may be varied depending on various criteria such as a desired minimum processing time, magnitude of inter-frame motion velocity, memory constraints, etc. As the number of iterations N increases there is a greater discrepancy between the output of the first embodiment and that of the second embodiment. The discrepancy is primarily due to the absence of iterative clipping of the intensity adjustments in the second embodiment. In the second embodiment clipping is performed only once, which imposes a weaker constraint on overcorrected values as the number of iterations grows.

Figure 10A:
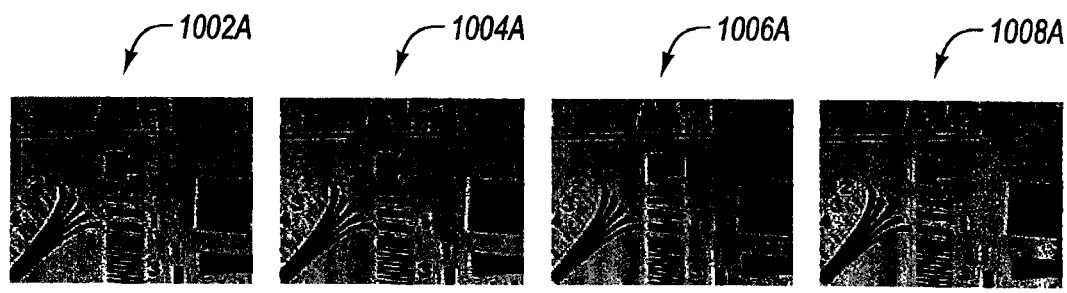
FIG. 10A shows output images produced by the first example method of FIG. 5.
Figure 10B:
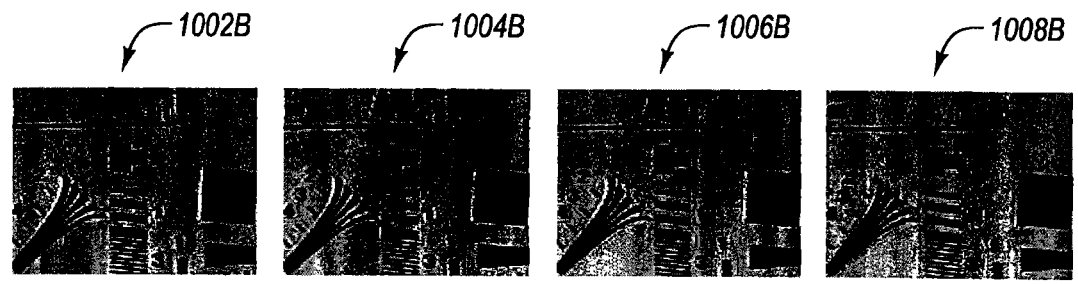
FIG. 10B shows output images produced by the second example method of FIG. 7.

FIGS. 10A and 10B show output images produced by the first and second embodiments, respectively. Image 1002A is a product of the first embodiment after five iterations and image 1002B is a product of the second embodiment in which five iterations are approximated. Images 1004A, 1006A, and 1008A correspond to ten iterations, twenty iterations, and forty iterations, respectively. Similarly, images 1004B, 1006B, and 1008B correspond to approximations of ten iterations, twenty iterations, and forty iterations, respectively. The inter-frame motion in each of images 1002A-1008A and 1002B-1008B is seven pixels per frame.

Figure 11:
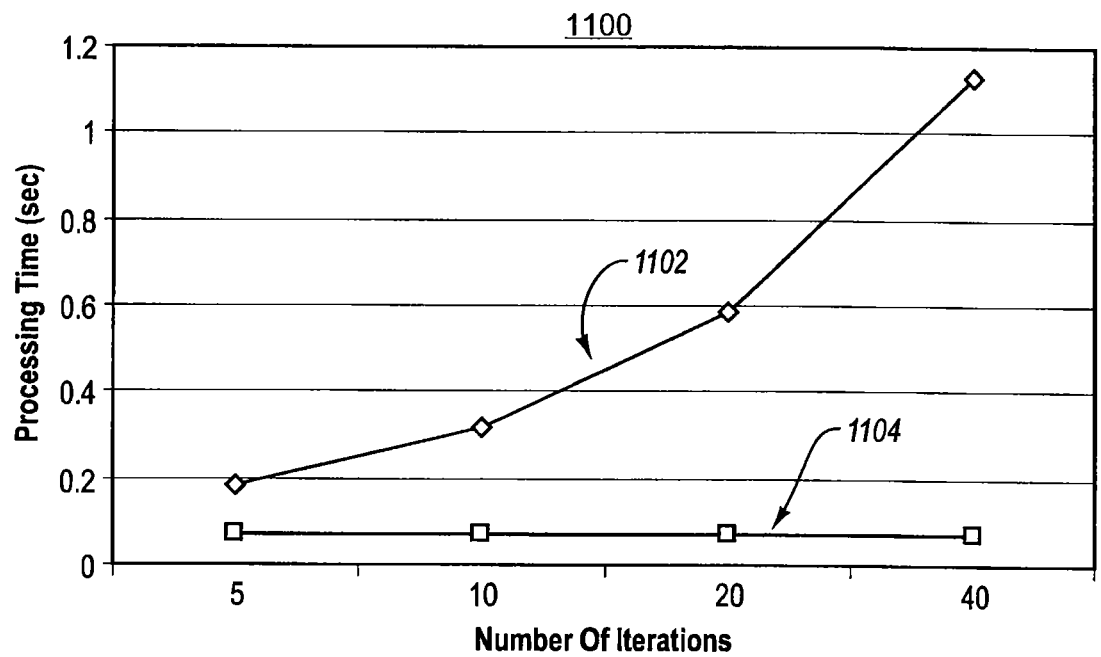
FIG. 11 shows a chart comparing a processing time for the first and second example methods at various iteration levels.

FIG. 11 shows a chart 1100 comparing a processing time for the first embodiment 1102 and second embodiment 1104 at various iteration levels. As evident from chart 1100, the processing time for the second embodiment 1104 does not vary significantly due to the single-pass filter used to approximate the multiple filtering iterations of the first embodiment.

The second embodiment is also distinct from the first embodiment in its lack of a regularization term. The regularization term is excluded in the second embodiment because it would introduce a non-linearity that would preclude reduction of multiple iterations into a single operation. For a small degree of inter-frame motion the difference in output due to the lack of a regularization term is substantially imperceptible. However, regularization plays a more significant role in error suppression when inter-frame motion exceeds about ten pixels per frame.

Third Example Embodiment

Figure 12:
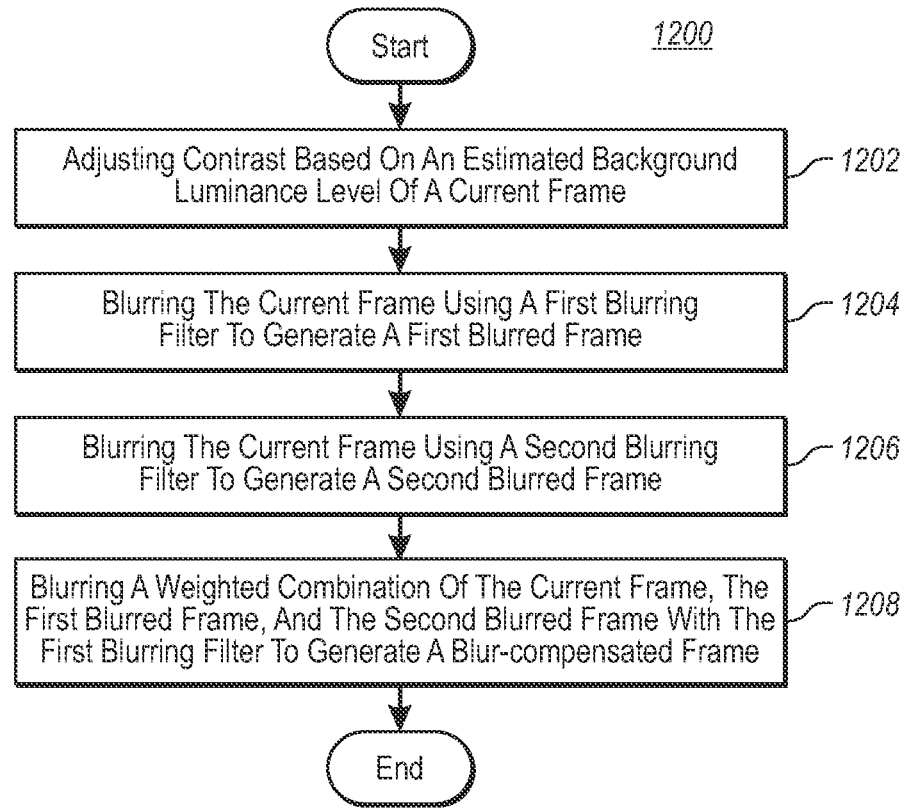
FIG. 12 is a flowchart for a third example method for motion blur pre-compensation.

FIG. 12 is a flowchart showing stages for a third example method 1200 for compensating for inter-frame motion. As in the first example method 400, method 700 processes pixels in a current frame based on a direction and extent of inter-frame motion to transform a current frame into a blur-compensated frame to be displayed in place of the current frame. The third embodiment, however, uses two uniform blurring filters to generate the blur-compensated frame and, unlike the first embodiment, is non-iterative.

Optionally, prior to applying the uniform blurring filters, an act of contrast adjustment may be performed on an input image I (stage 1202). In the first and second embodiments, output values outside of the allowable range are clipped to the range [0, 255]. As a result, blur reduction is sub-optimal for pixels close to a limit of the allowable range (i.e., 0 or 255). Without modifying the display's allowable range, one way to improve the output clarity is to adjust the contrast of the input image. Typically, contrast adjustment should be performed so as to avoid noticeable changes in the frame background luminance. To achieve this, the amount of adjustment at each pixel may be based on its distance from a background luminance level. In this way, the frame background remains unchanged, while the foreground contrast can be effectively scaled.

One way to implement contrast adjustment includes performing contrast adjustment on an input image I only if a contrast level of the image is above a contrast threshold. An input image contrast level $C_{curr}$ may be defined as a value between zero and one with one denoting full contrast with 255 levels, and 0.5 denoting half contrast with 128 levels. The contrast level $C_{curr}$ may be measured by the following formula:

$$C_{curr}=(Y_{Max}-Y_{Min})/255 \quad (20)$$

where $Y_{Max}$ and $Y_{Min}$ define an intensity data range of the input image and are derived from a sixteen bin histogram of pixel intensity values. For example, $Y_{Max}$ and $Y_{Min}$ may be the largest and smallest intensity levels, respectively, with a histogram count over five percent of the total pixel count. The input image contrast level $C_{curr}$ may then be compared to a threshold parameter C and, if $C_{curr}$ exceeds the threshold C, the contrast of each pixel location x, y in image I may be adjusted as follows:

$$I(x,y)=Y_{Bg}+(I(x,y)-Y_{Bg})\cdot C/C_{curr} \quad (21)$$

where $Y_{Bg}$ is a background level of intensity defined as the average of all intensity levels whose histogram count is over a threshold level (e.g., twenty percent) of the total pixel count. By defining contrast adjustment in this manner, pixels pertaining to the frame background will substantially remain unchanged. On the other hand, if $C_{curr}$ does not exceed the threshold C, image I is considered to have a sufficiently low risk of clipping distortion to forego contrast adjustment. Setting the contrast threshold parameter C to 0.8 as a default setting yields acceptable results. The contrast threshold parameter may be adjustable from its default value.

After performing any necessary contrast adjustment on a current frame, the contrast-adjusted frame is blurred using a first blurring filter to generate a first blurred frame (stage 1204) and blurred using a second blurring filter to generate a second blurred frame (stage 1206). For example, the first blurring filter may be the blurring filter H (denoted hereafter as H(v)) described above in connection with the first embodiment, which is defined by an inter-frame motion vector characterizing a direction and extent of inter-frame motion in the current frame. The second blurring filter may be a uniform low-pass filter $H(v_1)$ that is broader than H(v) with $v_1=3\times(v-1)+1$.

Next, a weighted combination of the contrast-adjusted frame, the first blurred frame, and the second blurred frame may be calculated and then blurred with the first blurring filter H(v) to generate a blur-compensated frame (stage 1208). For example, a weighted combination may be calculated by multiplying each of the current frame, the first blurred frame, and the second blurred frame with a weighting value and summing the resulting products. Thus, for example, a blur-compensated frame O may be calculated based on the contrast-adjusted frame I' according to the following formula:

$$O=H(v)\otimes \beta\cdot[w_1\cdot I'-w_2\cdot I'\otimes H(v)+w_3\cdot I'\otimes H(v_1)] \quad (22)$$

where the weights $w_1$, $w_2$, and $w_3$ satisfy the constraint $\beta\cdot[w_1-w_2+w_3]=1$. For example, according to an example implementation, $w_1$, $w_2$ and $w_3$ are set as follows:

$$w_2=2.0$$

$$w_3=0.24\cdot\beta/\max\{\beta-1,1\}$$

$$w_1=1/\beta+w_2-w_3 \quad (23)$$

If necessary, pixel intensities in the blur-compensated image O may be clipped to fall within a permissible range prior to being displayed, in accordance with Equation (19) above.

The value of the adjustment step size β in Equations (22) and (23) may be a constant. Alternatively, the adjustment step size β may be adaptive to background luminance levels in each frame. Like the other embodiments described herein, the inter-frame motion compensation performed by the third embodiment can result in overcompensation if the adjustment step size is set too large, causing undesirable edge artifacts, for example, to appear. Therefore, to avoid overcompensation the adaptive adjustment step size may be selected to provide as much motion compensation as possible without resulting in artifacts that would otherwise be visible.

The human visual system is unable to discern contrast levels in images having a relatively low or relatively high level of background luminance as well as in images having a mid-gray level of background luminance. Therefore, the contrast sensitivity of human vision is a function of image luminance. By determining β adaptively for each frame based on the frame's background luminance, overcompensation of images with mid-gray levels of background luminance can be avoided. (By virtue of their dependence on the value of β, one or more of the plurality of weighting values may also be said to depend on or be calculated as a function of the estimated background luminance.)

Figure 13:
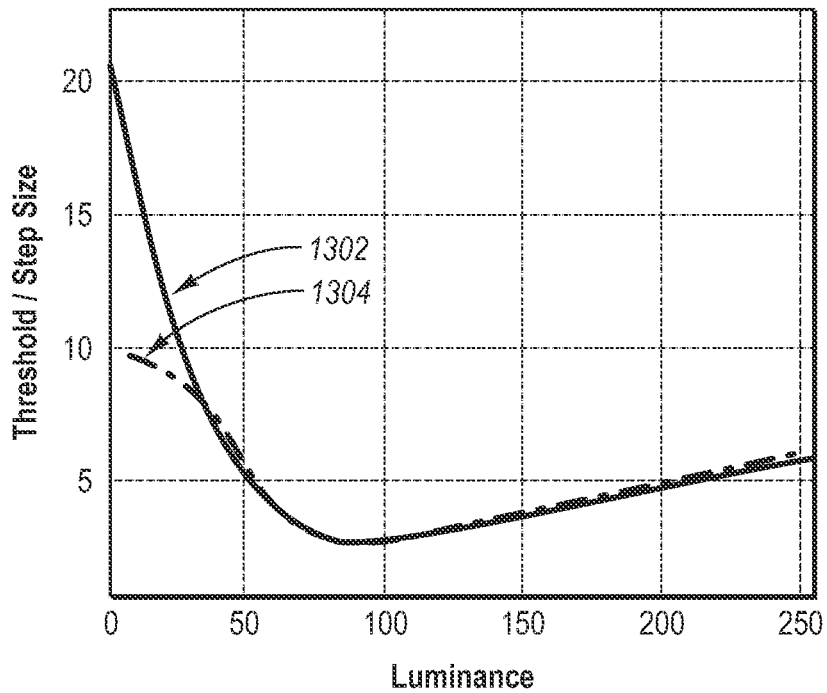
FIG. 13 shows a plot of a human minimum visibility threshold models.

A just noticeable difference (JND) model is a commonly used measure in image coding and watermarking to define a minimum visibility threshold, below which differences in image intensity are considered unperceivable. The JND model of Chou (See C. Chou and Y. C. Li, "A Perceptually Tuned Subband Image Coder Based on the Measure of Just-Noticeable-Distortion Profile," IEEE Transactions on Circuits and Systems for Video Technology, 5(6), December 1995), or a simplified version thereof, may be used to set a value for the adaptive adjustment step size β. FIG. 13 shows a plot of the Chou JND model of the human minimum visibility threshold 1302 for various luminance levels and corresponding values that may be used for the adaptive adjustment step size β 1304 in the blur-compensated frame O formula of Equation (22) above. Thus, as shown in FIG. 13, the JND model used to set β is not a direct match of the Chou JND model. For example, factors such as contrast masking and adaptation luminance are not taken into account. In addition, step size values in the low intensity range are clipped to avoid over-compensation.

The adaptive step size values at selected luminance levels can be pre-calculated and stored in a lookup array in memory. For example, sixteen different adaptive step size values corresponding to sixteen different luminance level intervals may be pre-calculated and stored in a lookup array. Depending on memory constraints and other related factors, more adaptive step size values may be calculated or fewer.

Table 3 shows an example adaptive step size lookup array. Given the estimated input frame luminance level $Y_{Bg}$, the stored adaptive step size at the closest luminance level may be retrieved from memory and used to set the value of β.

TABLE 3

| | $Y_{Bg}$ | | | | | | | | | | | | | | | |
|---|---|---|---|---|---|---|---|---|---|---|---|---|---|---|---|---|
| | 8 | 24 | 40 | 56 | 72 | 88 | 104 | 120 | 136 | 152 | 168 | 184 | 200 | 216 | 232 | 248 |
| β | 9.8 | 9.0 | 7.7 | 4.9 | 3.2 | 2.6 | 2.7 | 3.2 | 3.5 | 3.8 | 4.2 | 4.5 | 5.0 | 5.3 | 5.6 | 6.0 |

The background luminance of the current frame may be estimated based on a pixel intensity histogram of the current frame. Alternatively, inter-frame motion compensation may be performed on a pixel-wise basis and, therefore, a frame preceding the current frame in the sequence of digital video frames, which is likely to have a similar background luminance level, may instead be used to generate the pixel intensity histogram. For example, in one implementation a 16-bin intensity histogram is updated after processing each frame. The value of $Y_{Bg}$ may be the same value used in Equation (21) above to adjust contrast. For example, $Y_{Bg}$ may be an average of all intensity levels whose histogram count is over a threshold level (e.g., twenty percent) of the total pixel count in the frame.

The first and second blurring filters H(v) and H(v₁) may be uniform filters. A benefit of using only uniform filters to perform blur compensation is that individual pixel values need not be stored in memory. For example, given a horizontal uniform filter H(v) with length v and radius r, the image output at pixel location (x, y) may be expressed as follows:

$$O(x, y) = I(x, y) \otimes H(v) \quad (24)$$

$$= \frac{1}{v} \sum_{dx=-r}^{r} I(x + dx, y)$$

$$= \frac{1}{v} \left[ \sum_{dx=-r-1}^{r-1} I(x + dx, y) - I(x - r - 1, y) + I(x + r, y) \right]$$

$$= \frac{1}{v} [v \cdot O(x - 1, y) - I(x - r - 1, y) + I(x + r, y)]$$

Figure 14:
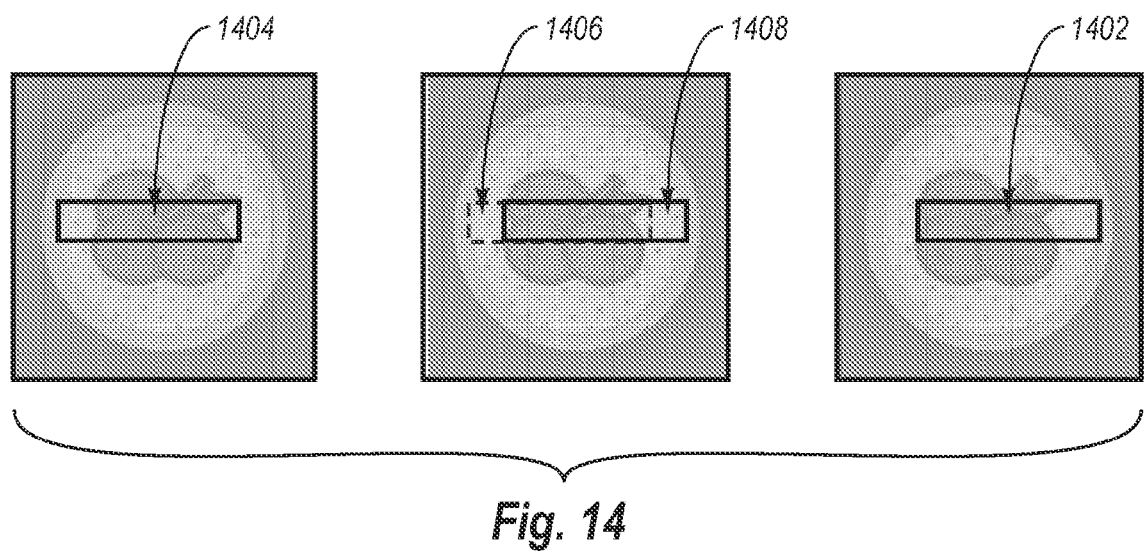
FIG. 14 shows an implementation of filtering an area of an image with a uniform filter.

Thus, a uniform filter may be implemented with only three lines in memory. FIG. 14 illustrates an example implementation of Equation (24) above. As shown in FIG. 14, area 1402 on the right side is equal to area 1404 less area 1406 plus area 1408. Therefore, to implement Equation (24) above on a particular pixel $p_{x,y}$, the pixel $p_{x,y}$ is first set to a previously processed pixel $p_{x-1,y}$ in the output image O. Then, pixel $p_{x-r-1,y}$ (scaled by 1/v) is subtracted and pixel $P_{x+r,y}$ (scaled by 1/v) is added to pixel $p_{x-1,y}$.

Figure 15:
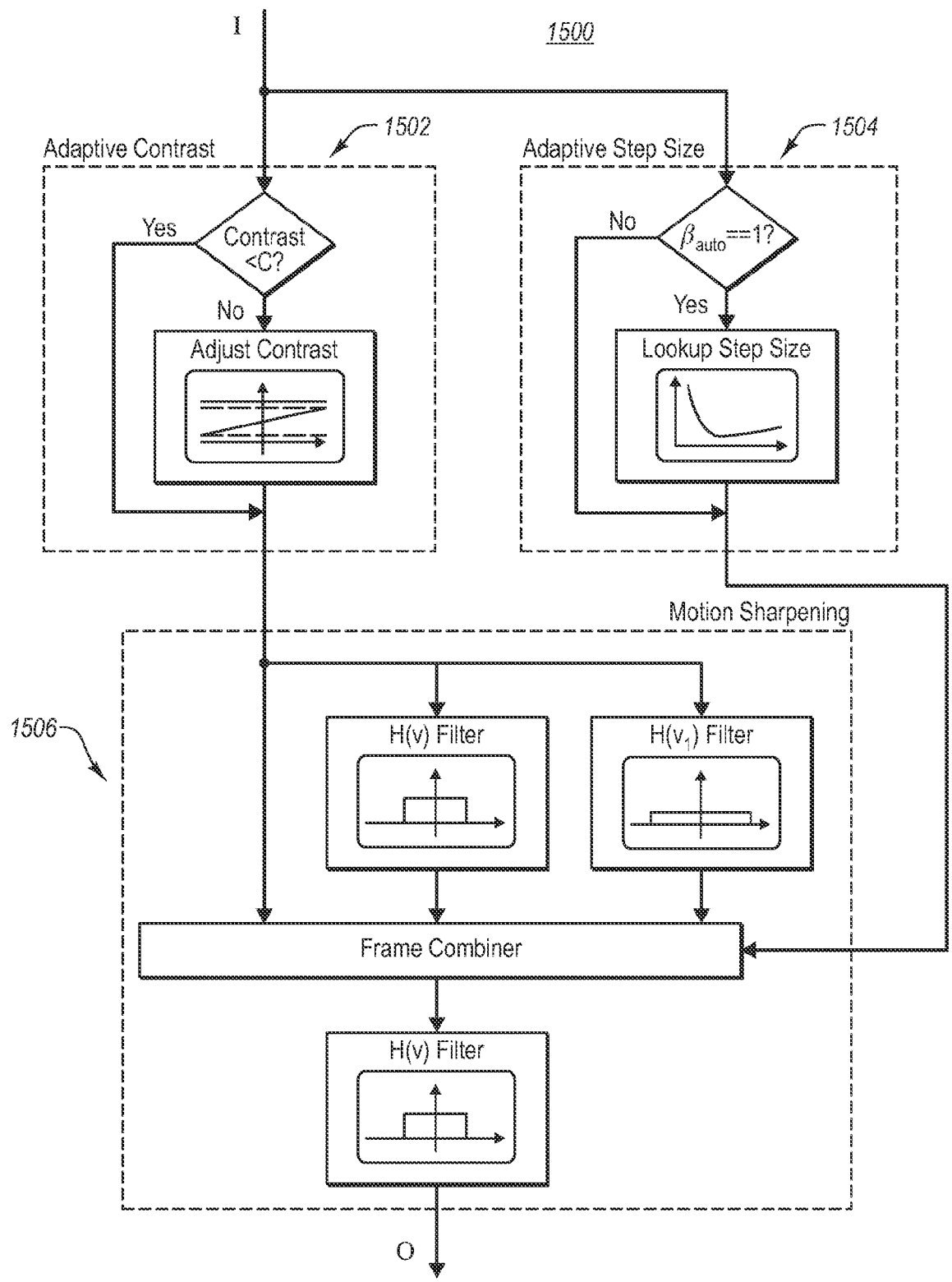
FIG. 15 is a functional block diagram view of a third example apparatus for performing the third example method.

FIG. 15 is a functional block diagram of an example apparatus 1500 for performing method 1200 of FIG. 12. Apparatus 1500 includes an adaptive contrast module 1502, an adaptive step size module 1504, and a motion sharpening module 1506. Apparatus 1500 may also include one or more processors (not shown) for controlling processes carried out by modules 1502-1506.

An input image I may be processed in parallel by adaptive contrast module 1502 and adaptive step size module 1504. Adaptive contrast module 1502 may carry out an adaptive contrast adjustment (stage 1202) in accordance with Equations (20) and (21) above. A contrast-adjusted image may then be fed to motion sharpening module 1506. Adaptive step size module 1504 may retrieve an adjustment step size β in a lookup array such as the array above in Table 3. Alternatively, β may be set to a predetermined constant value, and the lookup stage may be bypassed. Adaptive step size module 1504 may determine whether to bypass the lookup array using a flag such as $β_{auto}$. The flag $β_{auto}$ may be set to a first value (e.g., one) to indicate that an adaptive value for β is desired, or to a second value (e.g., zero), indicating that β is set to a constant default value (e.g., 2.5). Operations performed by each of modules 1502 and 1504 depend on a background luminance level $Y_{Bg}$, which may be determined by a processor (not shown) and fed to each of modules 1502 and 1504 as a separate input.

Motion sharpening module 1506 may carry out processing steps associated with stage 1208 and Equation (22) above. For example, motion sharpening module 1506 blurs the contrast-adjusted frame using a first blurring filter H(v) to generate a first blurred frame and blurs the contrast-adjusted frame using a second blurring filter H(v₁) to generate a second blurred frame. A frame combiner of motion sharpening module 1506 then calculates a weighted combination of the contrast-adjusted frame, the first blurred frame, and the second blurred frame. The resulting weighted combination is then blurred, e.g., with the first blurring filter, to generate a blur-compensated frame O as the output of apparatus 1500. The weight values may be determined based on the adjustment step size β received from adaptive step size module 1504, in accordance with Equation (23) above.

Fourth Example Embodiment

Figure 16:
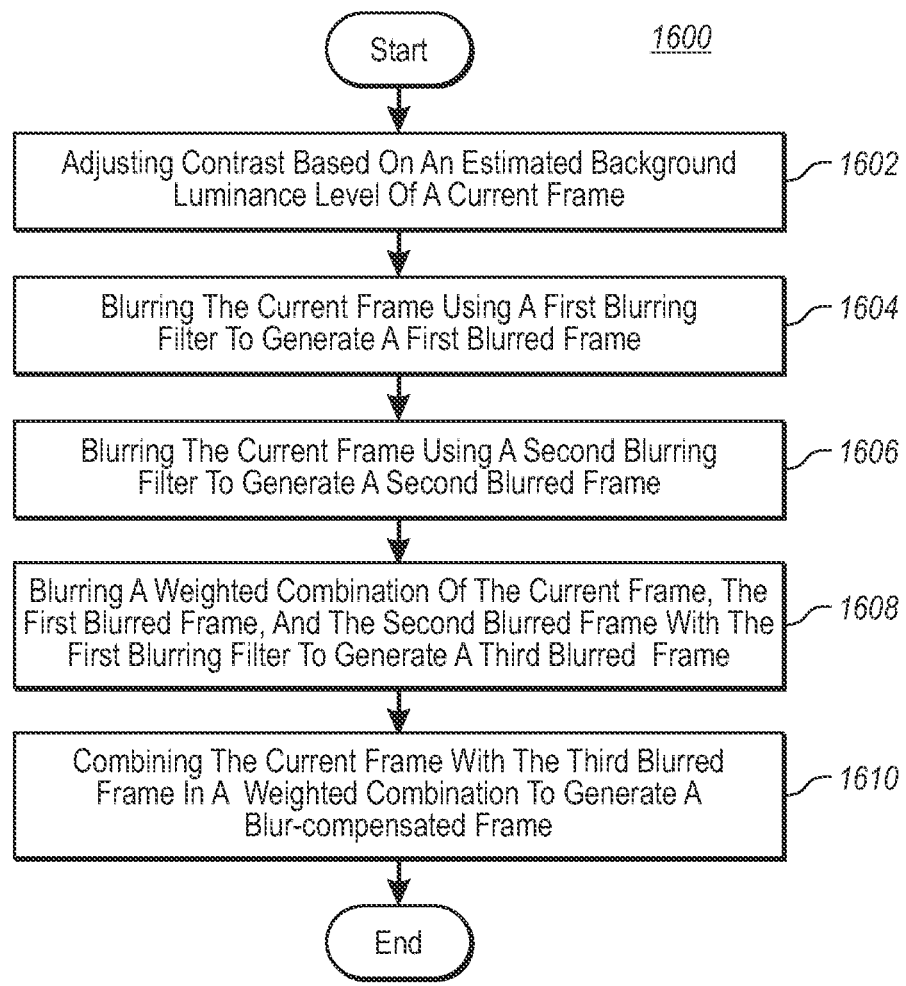
FIG. 16 is a flowchart for a fourth example method for motion blur pre-compensation.

FIG. 16 is a flowchart showing stages for a fourth example method 1600 for compensating for inter-frame motion. Stages 1602-1608 are the same as stages 1202-1208 in the third embodiment described above with reference to FIG. 12. The fourth embodiment, however, includes an additional combining stage at the end that essentially takes the output of method 1200, denoted as a third blurred frame, and combines it with the current frame in a weighted combination (stage 1610). The weighted combination may be expressed as follows:

$$O = \alpha \cdot I' + H(v) \otimes \beta \cdot [w_1' \cdot I' - w_2' \cdot I' \otimes H(v) + w_3' \cdot I' \otimes H(v_1)] \quad (25)$$

where α is a tunable factor between zero and one (e.g., 0.75) and the weights $w_1'$, $w_2'$, and $w_3'$ satisfy the constraint $β \cdot [w_1' - w_2' + w_3'] = (1-α)$. A discussion of the other symbols in Equation (25) may be found above in the third embodiment's description. According to an example implementation, $w_2'$ is a tunable constant (e.g., 1.5), $w_3'$ is $w_2'$ multiplied by a tunable scalar value (e.g., 0.15), and $w_1'$ is set as follows:

$$w_1' = (1-α)/β + w_2' - w_3' \quad (26)$$

As in the third embodiment, the value of the adaptive adjustment step size β may be a constant or adaptive to background luminance levels in each frame. For example, as described above with respect to the third embodiment, an adaptive adjustment step size lookup array, such as that shown in Table 4 below, may be used.

TABLE 4

| $Y_{Bg}$ | | | | | | | | | | | | | | | |
|---|---|---|---|---|---|---|---|---|---|---|---|---|---|---|---|
| 8 | 24 | 40 | 56 | 72 | 88 | 104 | 120 | 136 | 152 | 168 | 184 | 200 | 216 | 232 | 248 |
| β 4.8 | 4.4 | 2.9 | 1.9 | 1.4 | 1.2 | 1.2 | 1.3 | 1.5 | 1.6 | 1.7 | 1.8 | 1.9 | 2.0 | 2.1 | 2.4 |

Because contrast sensitivity of human vision is a function of image luminance, the visibility of an artifact is dependent on background luminance levels. The JND model discussed above with respect to FIG. 13 may therefore be used as a gauge for setting the adjustment step size β at each of various background luminance levels in the lookup array.

To determine adjustment step size values β for use with the filtering applied by Equation (25), the filter in Equation (25) above may first be applied to a calibration image $I_c$ using a range of different adjustment step size values (e.g., {$\bar{\beta}$=1.0, 1.1, ..., 9.9, 10.0}) and a sample motion inter-frame velocity (e.g., nine pixels per frame). The calibration image $I_c$ contains a step edge pattern with two uniform regions each having a different gray level (e.g., gray levels 64 and 192). Each output image $O_j$ (resulting from use of a corresponding step size value $\beta_j$ in set $\bar{\beta}$) is then compared on a pixel-wise basis to calibration image $I_c$ to determine a maximum absolute gray level difference, $D_j$, between calibration image $I_c$ and output image $O_j$. A resulting set of maximum absolute gray level differences, $\bar{D}$, is then used to select adjustment step size values for various different background luminance levels such that none of the adjustment step size values is likely to result in an output frame having edges that visibly differ (JND value) from those of a corresponding source frame. The adjustment step size values are selected in dependence on background luminance levels because the visibility of edge artifacts to the human eye depends on background luminance levels.

For example, for each background luminance level, $Y_k$, in a range of luminance levels (e.g., between 0 and 255), a JND value, $JND_k$, is determined by referencing a JND model such as the Chou JND model of the human minimum visibility threshold 1302 depicted in FIG. 13. (The JND values may be clipped to a maximum of 15.) Then, the largest adjustment step size value in set $\bar{\beta}$ corresponding to a gray level difference in set $\bar{D}$ that is less than $JND_k$ is selected as the adjustment step size for background luminance level $Y_k$. In this manner, an appropriate adjustment step size is determined for each background luminance level $Y_{Bg}$ in Table 4 above. To adjust a desired a degree of motion compensation, the JND values used to determine the entries in the lookup array may be scaled up or down, e.g., by a factor of 1.2 in one embodiment.

The tunable scalar factor α in Equation (25) controls a contribution of the source image to the filtered output of method 1600. Thus, the filtering performed by method 1600 is equivalent to that of method 1200 of the third embodiment when α is set to zero. On the other hand, setting a equal to one has an effect of making the blur-compensation filtering of method 1600 similar to the that of method 700 of the second embodiment. Thus, the provision of α in the weighted combination stage 1610 provides the flexibility of modifying the blur-compensation to be like that of the second embodiment, the third embodiment, or a combination filter having properties of both embodiments. Initial experimentation indicates that for images with complex or dense features, such as images of natural scenes, a larger value of α (e.g., greater than 0.5) produces a more successfully blur-compensated image than smaller values (e.g., less than 0.5). Conversely, for images that have simple or spare features, e.g., a step edge image, a smaller value of α works better.

Figure 17:
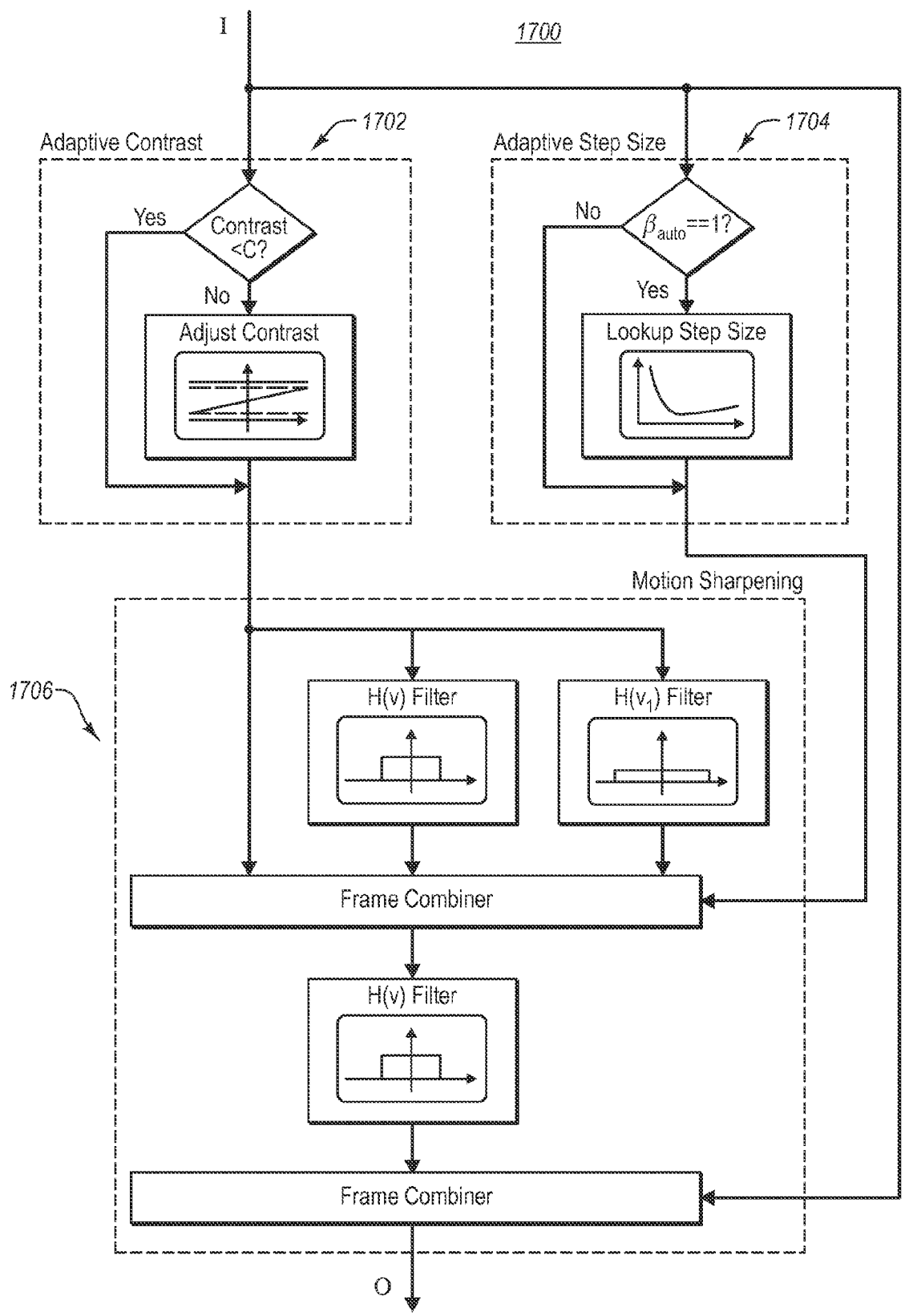
FIG. 17 is a functional block diagram view of a fourth example apparatus for performing the fourth example method.

FIG. 17 is a functional block diagram of an example apparatus 1700 for performing method 1600 of FIG. 16. Like apparatus 1500 of FIG. 15, apparatus 1700 includes an adaptive contrast module 1702, an adaptive step size module 1704, a motion sharpening module 1706, and may also include one or more processors (not shown) for controlling processes carried out by modules 1702-1706.

An input image I may be processed in parallel by adaptive contrast module 1702 and adaptive step size module 1704. Adaptive contrast module 1702 may carry out an adaptive contrast adjustment (stage 1702) in accordance with Equations (20) and (21) above. A contrast-adjusted image may then be fed to motion sharpening module 1706. Adaptive step size module 1704 may retrieve an adjustment step size β in a lookup array such as the array above in Table 4. Alternatively, β may be set to a predetermined constant value, and the lookup stage may be bypassed. As with adaptive step size module 1504 of apparatus 1500 shown in FIG. 15, adaptive step size module 1704 may determine whether to bypass the lookup array using a flag such as $\beta_{auto}$. Furthermore, operations performed by each of modules 1702 and 1704 depend on a background luminance level $Y_{Bg}$, which may be determined by a processor (not shown) and fed to each of modules 1702 and 1704 as a separate input.

Motion sharpening module 1706 may carry out processing steps associated with stages 1608 and 1610, represented by Equation (25) above. For example, motion sharpening module 1706 blurs the contrast-adjusted frame using a first blurring filter H(v) to generate a first blurred frame and blurs the contrast-adjusted frame using a second blurring filter H($v_1$) to generate a second blurred frame. A first frame combiner of motion sharpening module 1706 then calculates a first weighted combination of the contrast-adjusted frame, the first blurred frame, and the second blurred frame to generate a first weighted combination of frames. The first weighted combination is then blurred, e.g., with the first blurring filter, to generate a third blurred frame. The weight values in the first weighted combination may be determined based on the adjustment step size β received from adaptive step size module 1704, as described above. The third blurred frame may then be combined in a second weighted combination with the original image I to generate a blur-compensated frame O as the output of apparatus 1700. The weights used in the second weighted combination may be tunable scalar factor α, applied to the original image I, and adaptive adjustment step size β, applied to the third blurred frame, in accordance with Equation (25).

Other Example Embodiments

In addition to the various alternative embodiments described above, various other versions of inter-frame motion compensation may be implemented including versions in which various acts are modified, omitted, or added or in which the order of the depicted acts differ. For example, although adaptive contrast adjustment is described above in relation to certain embodiments, the same techniques may be applied to other embodiments to improve output clarity while avoiding noticeable changes in background luminance. Similarly, although use of an adjustment step size β that is adaptive to background luminance levels is described in relation to certain embodiments, the same techniques may be applied to other embodiments to more optimally reduce visibility of undesirable artifacts in motion-compensated frames.

Moreover, example methods 300, 400, 700, 1200, and 1600, and variations thereof disclosed herein can be implemented using hardware modules, software modules, or some combination thereof. Software modules may be provided in the form of computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

The example embodiments disclosed herein may be embodied in other specific forms. The example embodiments disclosed herein are to be considered in all respects only as illustrative and not restrictive.

What is claimed is:

1. A method for compensating for perceived blur due to inter-frame motion in a sequence of digital video frames based on a direction and extent of the inter-frame motion, the method comprising:
   generating a guess frame based on a current frame;
   combining a plurality of blurring filters derived from a direction and extent of inter-frame motion to define a first blur-compensating filter, i.e. $G_N$, wherein said first blur-compensation filter $G_N$ is independent of said guess frame;
   convolving the first blur-compensating filter $G_N$ with the guess frame to directly produced a first output frame, i.e. $O_N$, in the absence of any iterative updates to any intermediate image.

2. The method of claim 1, wherein each of said blurring filters is defined by an inter-frame motion vector characterizing a direction and extent of inter-frame motion.

3. The method of claim 1, wherein, said plurality of blurring filters are constructed from an initial blurring filter H, and said first blur-compensating filter $G_N$ simulates the effects of N iterative applications of said first blurring filter H.

4. The method of claim 3, wherein said initial blurring filter H is a uniform one-dimensional blurring filter.

5. The method of claim 3, wherein said first blur-compensating filter $G_N$ is a linear combination of said plurality of blurring filters.

6. The method of claim 3, wherein first blur-compensating filter $G_N$ is defined as:

$$G_N = \left(1 + n \cdot H_1 - n \cdot H_2 + \sum_{i=3}^{2n} (\alpha_{n-1,i} - \alpha_{n-1,i-2}) \cdot H_i\right)$$

for n=0 to N, $\alpha_{n,i}$ denotes the coefficient associated with $H_i$ at a simulated iteration n, and $\alpha_{n,m}=0$ for i>2n.

7. The method of claim 3, wherein pre-computed values of first blur-compensating filter $G_N$ for different values of N are stored in a memory, and the corresponding value of $G_N$ for a given value of N is accessed from said memory for convolving with guess frame in said step of convolving the first blur-compensating filter $G_N$ with the guess frame.

8. The method of claim 3, wherein said first blur-compensating filter $G_N$ has an initial radius of r pixels, said method further including:
   comparing said initial radius r with a predefined radius R, and conditionally truncating the radius r of first blur-compensating filter $G_N$ prior to said step of convolving the first blur-compensating filter $G_N$ with the guess frame, according to the following relation:

$$G_N(r) = \begin{cases} G_N(r) & \text{if } |r| \leq R \\ 0 & \text{otherwise} \end{cases}.$$

9. The method of claim 8, wherein after truncating the radius r of first blur-compensating filter $G_N$ and prior to said step of convolving the first blur-compensating filter $G_N$ with the guess frame, adjusting the weights of the coefficients of $G_N$ to ensure they sum to one.

10. The method of claim 9, wherein said predefined radius R is chosen to ensure that a majority of coefficients in $G_n$ are retained.

11. The method of claim 9, wherein the pixel radius of said initial blurring filter H is $R_H$, and said predefined radius R is set to four times $R_H$.

12. The method of claim 11, wherein the coefficients of the truncated first blur-compensating filter $G_n$ are pre-computed and stored in a look-up table, and are accessed from the look-up table for use in said step of convolving the first blur-compensating filter $G_N$ with the guess frame.

13. The method of claim 8, further including following the step of convolving the first blur-compensating filter $G_N$ with the guess frame;
   comparing each convolved pixel with a respective pixel in the current frame to generate an intensity adjustment for each respective pixel;
   adjusting each pixel in the guess frame with its respective intensity adjustment to generate a blur-compensated frame; and
   redefining the first output frame $O_N$ as said a blur-compensated frame.

14. The method of claim 1, further including:
   convolving the guess frame with a second first blur-compensating filter to produce a second output frame;
   weighing said initial guess frame with a first weight, i.e. w1;
   weighing said first output frame with a second weight, i.e. w2;

weighing said second output frame with a second weight, i.e. w3 combining the weighted guess frame, weighted first output frame, and weighted second output frame to create a composite frame;

convolving the composite frame with said first blur-compensating filter $G_N$ to produce a first blur-compensated frame.

15. The method of claim 14, wherein said second blur-compensating filter is a uniform low-pass filter, said uniform low-pass filter being broader than said first blur-compensating filter.

16. The method of claim 14, wherein the step to create said composite frame includes multiplying said composite frame by an adjustment step size $\beta$, and the values of adjustment step size $\beta$, first weight w1, second weight w2, and third weight w3 are selected to satisfy the following relationship: $\beta \cdot [w_1 - w_2 + w_3] = 1$.

17. The method of claim 14, further including:

adding a weighted guess frame to said first blur-compensated frame to produce a second blur-compensated frame.

18. The method of claim 17, wherein said weighted guess frame is defined weighing said guess frame with a fourth weight $\alpha$, where $\alpha$ a is a tunable factor between zero and one, and satisfies the following relationship:

$\beta \cdot [w_1 - w_2 + w_3] = (1 - \alpha)$.

19. The method as recited in claim 14, wherein at least one of said first weight, second weight and third weight is calculated as a function of an estimated background luminance of the guess frame.

* * * * *